Aug. 24, 1954   W. H. RANDALL   2,687,246
PACK FOR FRUIT AND OTHER ARTICLES
Filed May 27, 1950   4 Sheets-Sheet 1
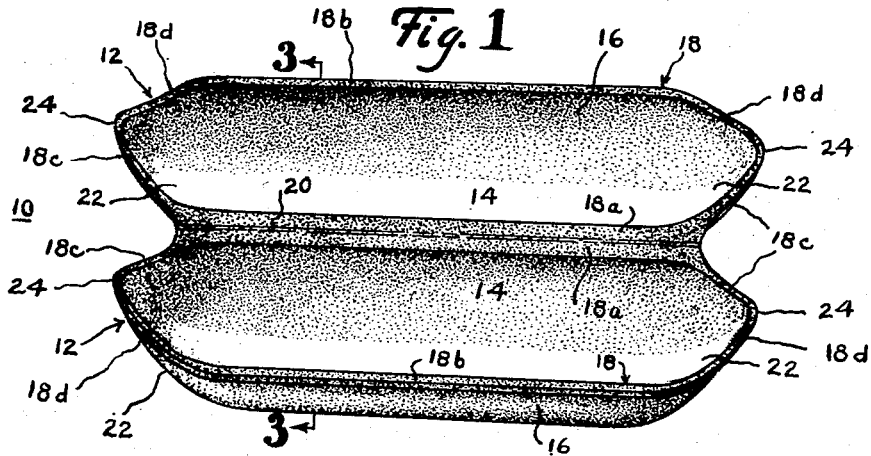
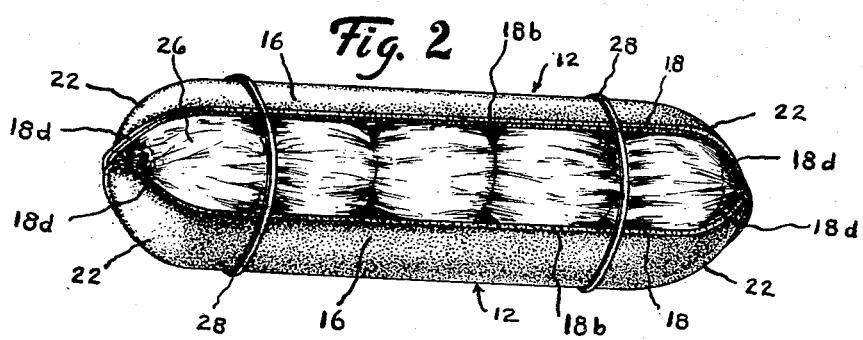
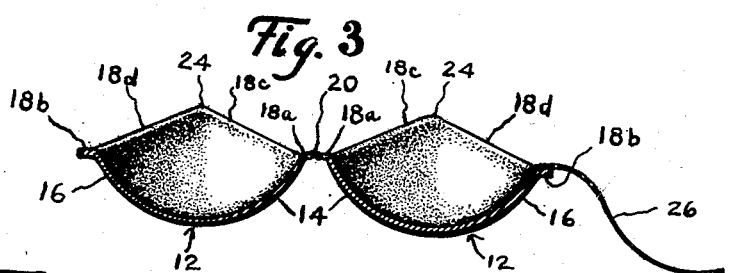
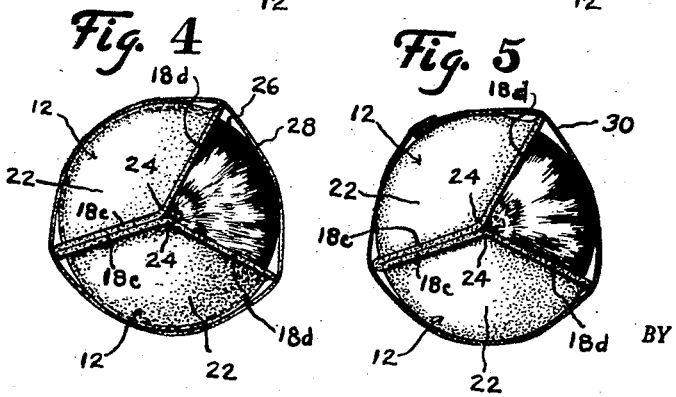
INVENTOR.
WALTER H. RANDALL
BY Arnold C. Rood
ATTORNEY Aug. 24, 1954 W. H. RANDALL 2,687,246
PACK FOR FRUIT AND OTHER ARTICLES
Filed May 27, 1950 4 Sheets-Sheet 2
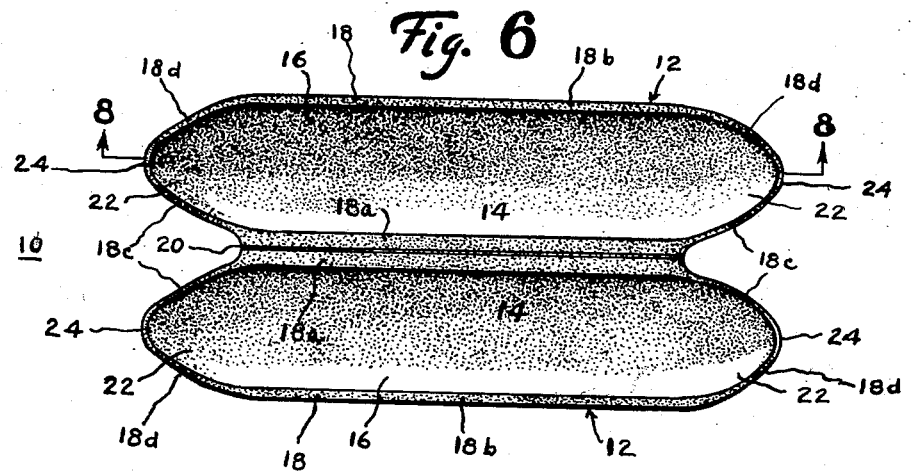
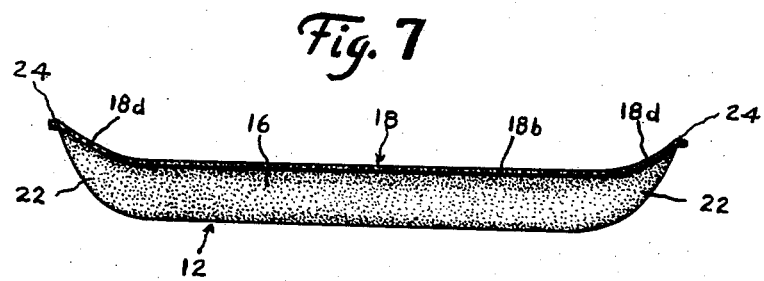
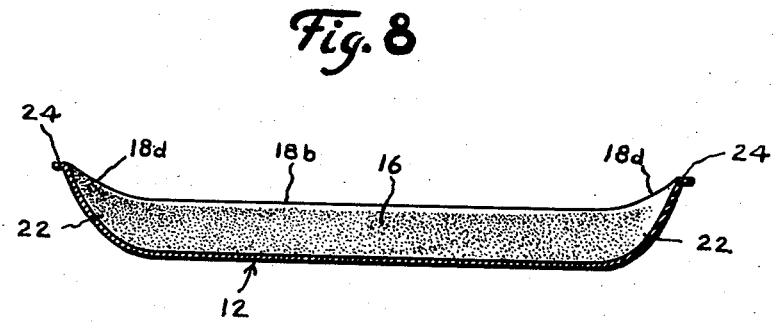
INVENTOR.
WALTER H. RANDALL
BY
Arnold C. Rood
ATTORNEY

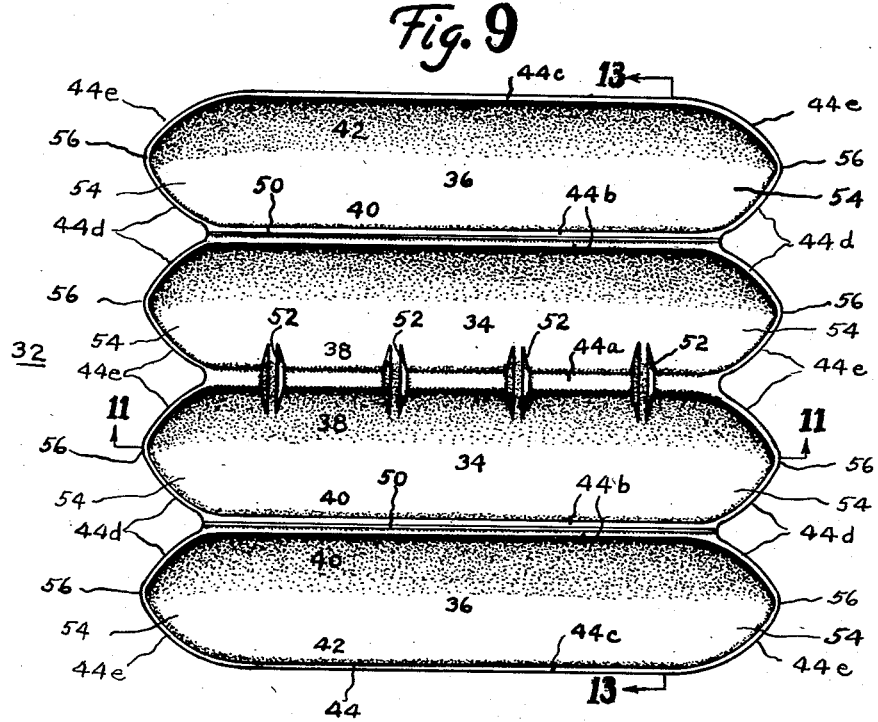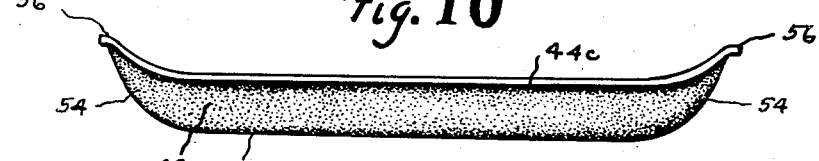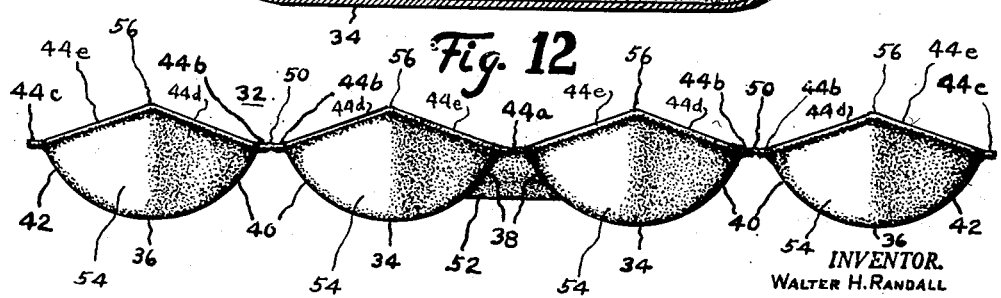

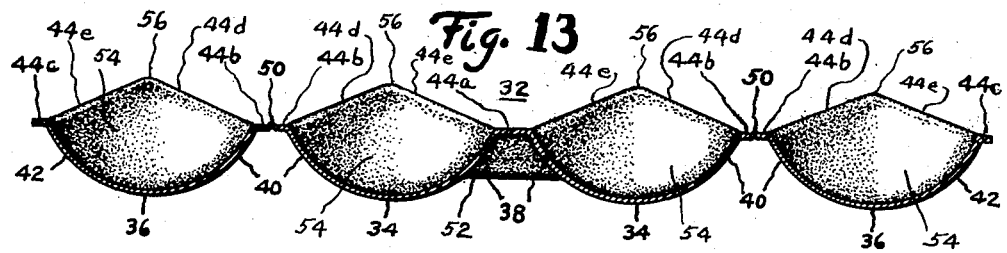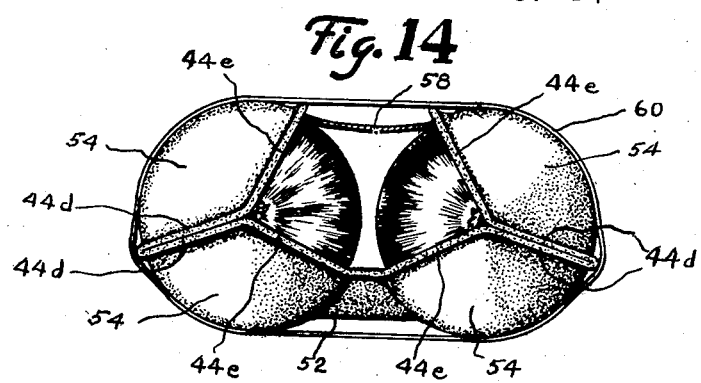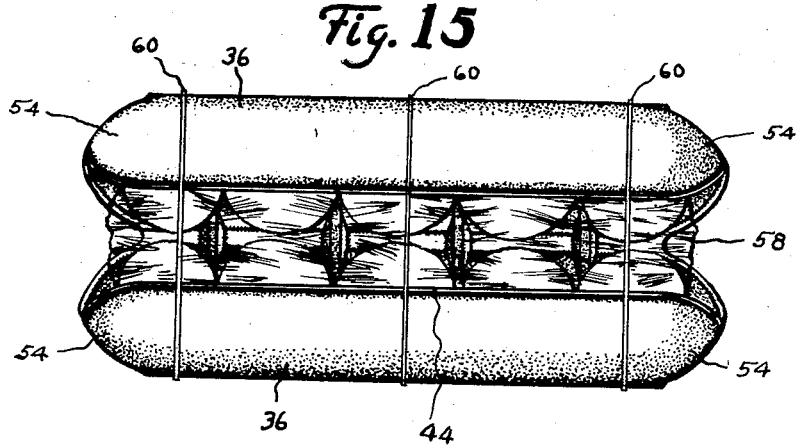

Patented Aug. 24, 1954

2,687,246

UNITED STATES PATENT OFFICE 2,687,246

PACK FOR FRUIT AND OTHER ARTICLES

Walter H. Randall, Waterville, Maine, assignor, by mesne assignments, to The Canal National Bank of Portland, a national banking association, and Porter Thompson, trustees Application May 27, 1950, Serial No. 164,769

9 Claims. (Cl. 229—2.5)

This invention relates generally to packing materials, and more particularly to molded pulp packs for fruit and other articles.

There is provided, by this invention, a unitary pack for fruit or other articles comprising a sheet of molded pulp of substantially uniform thickness and which may be formed directly to the desired shape by suction molding from an aqueous slurry of paper- or wood-pulp. The pack comprises generally a pair of elongated tray-like sections having side walls terminating in the plane of the sheet. The sections are hingedly secured together along the upper margins of adjacent side walls, and have end portions each extending beyond the hinge. The adjacent margins of said sections beyond the hinge are shaped to constitute limiting margins, so that when the sections are overfolded, the limiting margins meet while the opposite longitudinal edges of the sections are spaced apart, thus producing a longitudinally extending display opening of predetermined minimum width.

The illustrated overfolded pack is generally tubular in character and the sections are transversely curved and are provided with rounded end portions which extend above the plane of the sheet and terminate in apexes located midway between the sides of each section. The sections are provided with peripheral flanges which are located in the general plane of the sheet along the longitudinal edges of the sections and which extend around the end portions above the general plane of the sheet. The flanges adjacent to the ends of the hinged sections meet and form convenient limiting margins which control the minimum width of the display opening. The peripheral flanges provide additional stiffness and rigidity to the pack.

It will be understood that the sections may be of any suitable transverse section, and need not be similar. The pack may be shaped to accommodate articles of varying size, and furthermore, the sections may be contoured partially to conform to the shape of individual articles.

It is desirable under some conditions to provide a pack for a larger number of articles than can conveniently be packed in a pair of sections, and hence, this invention contemplates a pack wherein an integral sheet of molded pulp is contoured to provide two pairs of similar elongated tray-like sections disposed in transverse alignment. Additional rigidity may be provided between the adjacent sections of the respective pairs by forming transversely extending ribs between said pairs of sections. The adjacent longitudinal side wall margins of each pair of sections are hingedly secured together thus permitting overfolding of the hinged sections toward each other. The limiting margins of each pair of sections meet while the opposite longitudinal margins of each pair of sections are spaced apart and while the opposite longitudinal flanges of the pack are likewise spaced apart, thereby providing a display opening having predetermined minimum transverse dimensions.

The display opening in the two above-mentioned types of packs may conveniently be covered by a transparent sheet such as of cellophane. Conveniently, the longitudinal edges of the transparent sheet may be disposed within the pack to span the display opening and protect the contents thereof from dirt and dust. The single pack or the double pack may be maintained in closed condition by any suitable means such as elastic bands which may be slipped over the ends of the pack after the pack has been filled. Alternatively, an overall wrap of cellophane or the like may be employed, and the ends of the wrap conveniently may be folded over the ends of the pack and heat-sealed.

The pack constructed and arranged as described above provides an inexpensive pack for fruits and other articles, and may be filled quickly and easily and sealed with the minimum of packaging equipment. The pack is formed of material which is sufficiently strong and rigid to provide convenient means for packaging and transporting fruit or other articles.

In the drawings, illustrating embodiments of the invention:

Fig. 1 is a perspective view of a pack in accordance with the present invention, the pack being in open position;

Fig. 2 is a perspective view showing the pack in folded position, the sections being held together by elastic bands, and the view showing the display opening, by means of which the contents may be viewed as through a protective transparent covering over the contents;

Fig. 3 is a transverse sectional view taken on line 3—3 of Fig. 1 and showing a transparent covering member, prior to placing the contents in the pack;

Fig. 4 is an end elevation of the filled pack shown in Fig. 2;

Fig. 5 is an end elevation similar to Fig. 4, but showing in section transparent covering material on the outside of the pack;

Fig. 6 is a plan view of the pack in open position;

Fig. 7 is a front elevation of the pack in open position;

Fig. 8 is a longitudinal vertical section taken on line 8—8 of Fig. 6;

Fig. 9 is a plan view of a modification of the invention in which two pairs of tray-like sections are adjacently located to provide a double row pack, the pack being shown in open position;

Fig. 10 is a front elevation of the pack shown in Fig. 9;

Fig. 11 is a longitudinal vertical section taken on line 11—11 of Fig. 9;

Fig. 12 is an end elevation, on an enlarged scale, of the pack shown in Fig. 9;

Fig. 13 is a transverse vertical section on an enlarged scale, taken on line 13—13 of Fig. 9;

Fig. 14 is an end elevation on an enlarged scale of the double row pack in closed position and containing fruit, the fruit being covered with a transparent sheet and the pack being held in closed position by elastic bands; and Fig. 15 is a top plan view of the closed pack shown in Fig. 14.

A preferred embodiment of the invention illustrated in Figs 1 to 8 of the drawings comprises an integral sheet 10 of molded pulp of substantially uniform thickness which is contoured to provide a pair of similar, elongated, transversely curved, tray-like sections 12 depressed below the general plane of the sheet 10. The adjacent and opposite longitudinal side walls 14 and 16 of the sections 12 terminate in peripheral flange portions 18a and 18b in the general plane of the sheet 10. The sections 12 are hingedly secured together along adjacent flange portions 18a by a fold crease or hinge 20. The ends of the sections 12 are closed by rounded end portions 22 which extend longitudinally beyond the hinge 20 and extend upwardly above the general plane of the sheet. The end portions 22 extend upwardly to apexes 24 which as illustrated are located substantially midway between the side walls 14 and 16 of the sections and substantially in the longitudinal axis of the overfolded pack. The apexes 24 may be located elsewhere depending upon the type of end closure desired. The peripheral flange portions 18c and 18d extend about the end portions 22 above the general plane of the sheet. The peripheral flange portions 18a, 18b, 18c and 18d together constitute peripheral flanges 18 extending around the upper margins of the sections 12.

The adjacent flange portions 18c extending from the ends of the hinges 20 to the apexes 24 constitute limiting margins which meet, when the sections 12 are overfolded, while the opposite longitudinal flange portions 18b are still spaced apart, thereby providing a longitudinally extending display opening of predetermined minimum width, through which the contents of the pack may be viewed. It will be understood, of course, that the pack may be employed to contain articles of sufficiently large transverse dimension so as to prevent the flange portions or limiting margins 18c from actually meeting.

The generally cylindrical pack shown in Figs. 1 to 8 may be of any suitable size and, as illustrated, is shown as being sufficiently long to receive five apples. The transverse dimensions of the pack, as well as the length thereof, may be varied to accommodate articles of different size or diameter. The pack, however, is arranged to provide for normal variation as it customary in fruit of a particular size or grade. The display opening between the opposite flange portions 18b (Figs. 2, 4 and 5) is shown as sufficiently wide to permit approximately one-fourth of the circumference of the contained articles to be viewed through the display opening. It is evident, however, that the width of said opening may be varied as desired.

The contents of the pack may be protected at the display opening by a sheet of material 26 such as cellophane. The sheet 26 may be placed in one of the sections 12 (Fig. 3) prior to filling the pack. The pack may then be filled and the sheet 26 folded over the contents of the pack, and the other section 12 folded thereover. The transparent sheet 26 thus covers the contents of the pack and protects it from dust and dirt. The filled pack may be secured in overfolded condition by suitable securing means such as elastic bands 28 encircling the pack (Figs. 2 and 4). Such securing means are simple and require a minimum of packing equipment.

In Fig. 5 is shown a modified form of closure wherein a sheet of transparent wrapping material 30 such as cellophane is wrapped around the outside of the overfolded pack containing the fruit or other articles. At the ends of the pack, the sheet 30 may be folded over (not shown) and heat-sealed, or the sheet and the overfolded pack may be secured in any other suitable manner.

The pack, described above, provides a satisfactory and inexpensive pack which can be quickly and easily filled and sealed. In some instances, however, it is desirable to pack a greater number of articles than can conveniently be contained in the single or unit pack.

In Figs. 9 to 15 there is shown a pack for fruit or other articles comprising an integral sheet 32 of molded pulp contoured to provide two pairs of similar, elongated, transversely curved tray-like sections 34 and 36 disposed in transverse alignment and having longitudinally extending side walls 38, 40 and 42 terminating in peripheral flange portions 44a, 44b, and 44c in the general plane of the sheet. The sections 34, 36 of each pair are hingedly secured together along the crease lines or hinges 50 in the flanges 44b of adjacent side walls 40.

The sheet 32 is shown as provided with transverse ribs 52 to provide stiffness between the adjacent sections 34 of the respective pairs. Each of the sections 34, 36 have rounded end portions 54 extending longitudinally beyond the hinges 50 and above the general plane of the sheet to apexes 56 disposed midway of the side walls of the respective sections. Peripheral flange portions 44d and 44e extend about the end portions 54 and above the plane of the sheet. The adjacent flange portions 44d of the peripheral flanges 44 of the sections of each pair 34, 36 from the hinges 50 to the apexes are shaped to constitute limiting margins.

When the sections are overfolded (Fig. 14) the limiting margins 44d of each pair of sections 34, 36 meet while the opposite longitudinal flange portions 44e of each pair of overfolded sections are spaced apart and the opposite longitudinal flanges 44c are likewise spaced apart, thereby providing a display opening of predetermined minimum transverse dimensions.

The contents of the filled pack may be protected at the display opening by a suitable sheet of transparent material 58, such as cellophane. The pack may be secured in overfolded position by any suitable means, such as the elastic band 60.

It will be understood that various changes may

I claim:

1. An expendible sales carton for packaging generally spherical articles such as fruits and vegetables, said carton comprising an integral molded pulp sheet of substantially uniform thickness contoured to provide a plurality of coextensive elongated concave tray-like sections each long enough to hold a plurality of the spherical articles and shallow enough to receive only a minor segment of each article, the sections extending parallel to each other with the concavities facing in the same direction, each section having a pair of longitudinally-extending marginal walls joined at their longitudinal ends by end segments, and a pair of sections being hinged together at their intervening marginal walls to fold into opposed juxtaposition against the articles received in one of the sections, and the end segments being similarly tapered outwardly and extending up to a level higher than the marginal walls as well as the balance of the sheet to act as yieldable stop means limiting the amount the sections can be folded together, for yieldably holding apart the sides of the sections opposite the hinge and providing a display opening narrower than the articles through which opening all the articles in the two folded sections can be seen.

2. The invention of claim 1 in which the end segments curve upward beyond the longitudinal ends of the hinge.

3. The invention of claim 2 in combination with articles packaged in it and narrow securing means wrapped around the carton between adjacent articles to hold it in folded condition without appreciably hiding the articles from view.

4. An expendible sales carton for packaging generally spherical articles such as fruits and vegetables, said carton being in the form of an integral molded pulp sheet of substantially uniform thickness contoured to provide two elongated concave tray-like sections each long enough to hold a plurality of the spherical articles and shallow enough to receive only a minor segment of each article, the sections extending parallel to each other with the concavities facing in the same direction, each section having longitudinally-extending marginal walls joined at their longitudinal ends by end segments, and the sections being hinged together at their intervening marginal walls to fold into opposed juxtaposition against the articles received in one of the sections and shaped to form a generally cylindrical container when so folded, said sections being symmetrical about the hinge connection, and the end segments being tapered up to a level higher than the marginal walls as well as the balance of the sheet to act as stop means limiting the amount the sections can be folded together, for holding apart the sides of the sections opposite the hinge and providing a display opening narrower than the articles through which opening all the articles in the folded section can be seen.

5. The invention of claim 1 wherein said integral molded pulp sheet is contoured to provide two pairs of elongated, tray-like sections, each section having side walls terminating in the general plane of the sheet, the sections of each pair being hingedly secured together along the upper margins of adjacent side walls, the sheet being contoured to provide stiffness between the adjacent sections of the respective pairs to keep the pairs from hinging with respect to each other.

6. The invention of claim 1 wherein said integral molded pulp sheet is contoured to provide two pairs of elongated, tray-like sections, each of said sections having end portions extending longitudinally beyond said hinges and upwardly above the plane of the sheet to an apex above the remainder of the sheet to constitute limiting margins so that when the sections are overfolded, the limiting margins of each pair of sections meet while the opposite longitudinal margins of each pair of overfolded sections are spaced apart.

7. The invention of claim 1 wherein said integral molded pulp sheet is contoured to provide two pairs of elongated, tray-like sections, each of said sections having rounded end portions each extending longitudinally beyond said hinges and upwardly above the plane of the sheet to an apex above the remainder of the sheet to constitute limiting margins so that when the sections are overfolded, the limiting margins of each pair of sections meet while the opposite longitudinal margins of each pair of overfolded sections are spaced apart.

8. The invention of claim 1 wherein said integral molded pulp sheet is contoured to provide two pairs of elongated, tray-like sections, each section having longitudinally extending side walls terminating in peripheral flanges in the general plane of the sheet, the sections of each pair being hingedly secured together along the flanges of adjacent side walls, the sheet being contoured to provide stiffness between the adjacent sections of the respective pairs, each of said sections having end portions extending longitudinally beyond said hinges, said peripheral flanges extending about said end portions, the peripheral flanges of the sections of each pair beyond said hinges being shaped to constitute resilient limiting margins so that when the sections are overfolded, the limiting margins of each pair of sections meet while the opposite longitudinal flanges of each pair of overfolded sections are spaced apart.

9. The invention of claim 1 wherein said integral molded pulp sheet is contoured to provide two pairs of similar, elongated tray-like sections disposed in transverse alignment, each section having a depression in the form of a segment of a cylinder below the general plane of the sheet and having longitudinally extending side walls terminating in peripheral flanges in the general plane of the sheet, the sections of each pair being hingedly secured together along the flanges of adjacent side walls, the sheet being ribbed to provide stiffness between the adjacent sections of the respective pairs, each of said sections having end portions extending lonigtudinally beyond said hinges and above the general plane of the sheet to an apex, said peripheral flanges extending about said end portions, the adjacent portions of the peripheral flanges of the sections of each pair beyond and above said hinges being shaped to constitute limiting margins so that when the sections are overfolded, the limiting margins of each pair of sections meet while the opposite longitudinal flanges of each pair of overfolded sections are spaced apart and the opposite longitudinal flanges of the pack are likewise spaced apart, thereby providing a pack with two generally cylindrical compartments and a display opening through which all the contents are visible.

(References on following page)

References Cited in the file of this patent

UNITED STATES PATENTS

| Number | Name | Date |
|---|---|---|
| 147,332 | Knight | Feb. 10, 1874 |
| 1,685,392 | Beadle | Sept. 25, 1928 |
| 1,746,838 | Koppelman | Feb. 11, 1930 |
| 1,911,175 | Koppelman | May 23, 1933 |
| 1,975,127 | Sherman | Oct. 2, 1934 |
| 1,978,806 | Medoff | Oct. 30, 1934 |
| 2,078,488 | Farnham | Apr. 27, 1937 |
| 2,089,728 | Brogden | Aug. 10, 1937 |
| 2,423,756 | Chaplin | July 8, 1947 |
| 2,435,698 | Running | Feb. 10, 1948 |